US011305269B2

(12) United States Patent
Deibel et al.

(10) Patent No.: US 11,305,269 B2
(45) Date of Patent: Apr. 19, 2022

(54) COATED WALL-FLOW FILTER

(71) Applicant: UMICORE AG & CO. KG, Hanau-Wolfgang (DE)

(72) Inventors: Naina Deibel, Pfungstadt (DE); Martin Foerster, Büdingen (DE); Antje Oltersdorf, Freiburg (DE); Juergen Koch, Hanau (DE); Martin Roesch, Rodgau (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 0 days.

(21) Appl. No.: 17/045,860

(22) PCT Filed: Mar. 29, 2019

(86) PCT No.: PCT/EP2019/057997
§ 371 (c)(1),
(2) Date: Oct. 8, 2020

(87) PCT Pub. No.: WO2019/197177
PCT Pub. Date: Oct. 17, 2019

(65) Prior Publication Data
US 2021/0138447 A1 May 13, 2021

(30) Foreign Application Priority Data
Apr. 9, 2018 (DE) .................... 10 2018 108 346.7

(51) Int. Cl.
| | | |
|---|---|---|
| *F01N 3/10* | (2006.01) | |
| *F01N 3/20* | (2006.01) | |
| *F01N 3/28* | (2006.01) | |
| *B01J 21/04* | (2006.01) | |
| *B01J 23/46* | (2006.01) | |
| *B01J 35/00* | (2006.01) | |
| *B01J 35/04* | (2006.01) | |
| *B01J 37/02* | (2006.01) | |
| *B01D 46/24* | (2006.01) | |
| *B01D 53/94* | (2006.01) | |

(52) U.S. Cl.
CPC ............ *B01J 35/04* (2013.01); *B01D 46/247* (2013.01); *B01D 46/2429* (2013.01); *B01D 46/2474* (2013.01); *B01D 53/945* (2013.01); *B01D 53/9418* (2013.01); *B01J 21/04* (2013.01); *B01J 23/464* (2013.01); *B01J 35/0006* (2013.01); *B01J 37/0215* (2013.01); *F01N 3/101* (2013.01); *F01N 3/2066* (2013.01); *F01N 3/2803* (2013.01); *B01D 46/24491* (2021.08); *B01D 46/24492* (2021.08); *B01D 2255/1023* (2013.01); *B01D 2255/1025* (2013.01); *B01D 2255/2092* (2013.01); *B01D 2255/9155* (2013.01); *B01D 2279/30* (2013.01); *F01N 2370/02* (2013.01)

(58) Field of Classification Search
CPC .......... B01D 46/2418; B01D 46/24491; B01D 53/92; B01D 53/94; B01D 2201/18; B01D 2201/186; B01D 2201/62; B01D 2258/012; B01D 2258/014; B01D 2275/30; F01N 3/021; F01N 3/0222; F01N 3/035; F01N 3/10; F01N 2250/02
See application file for complete search history.

(56) References Cited

U.S. PATENT DOCUMENTS

| | | | |
|---|---|---|---|
| 108,408 | A | 10/1870 | Tilghman |
| 4,351,811 | A | 9/1982 | Matsuda et al. |
| 4,609,563 | A | 9/1986 | Shimrock et al. |
| 6,220,791 | B1 | 4/2001 | Hutchins |
| 6,387,338 | B1 | 5/2002 | Anatoly et al. |
| 6,468,941 | B1 | 10/2002 | Bortun et al. |
| 6,478,874 | B1 | 11/2002 | Rosynsky et al. |
| 6,548,105 | B2 | 4/2003 | Kiessling et al. |
| 6,605,264 | B2 | 8/2003 | Bortun et al. |
| 6,843,971 | B2 | 1/2005 | Schäfer-Sindlinger et al. |
| 6,875,725 | B2 | 4/2005 | Lidner et al. |
| 7,041,622 | B2 | 5/2006 | Nunan |
| 8,277,880 | B2 | 10/2012 | Sato et al. |
| 8,388,721 | B2 | 3/2013 | Ishizawa |
| 8,454,917 | B2 | 6/2013 | Hoyer et al. |
| 8,495,968 | B2 | 7/2013 | Tsuji et al. |
| 8,534,221 | B2 | 9/2013 | Tsuji et al. |
| 8,632,852 | B2 | 1/2014 | Tsuji et al. |
| 8,640,440 | B2 | 2/2014 | Klingmann et al. |
| 8,663,588 | B2 | 3/2014 | Lidner et al. |
| 8,678,196 | B2 | 3/2014 | Kaiser et al. |

(Continued)

FOREIGN PATENT DOCUMENTS

| | | |
|---|---|---|
| DE | 28 32 002 A1 | 1/1979 |
| DE | 4225970 C1 | 4/1994 |

(Continued)

OTHER PUBLICATIONS

International Search Report for International Patent Application No. PCT/EP2019/057997 dated Jun. 14, 2019 (3 Pages in German with translation).
Written Opinion for International Patent Application No. PCT/EP2019/057997 dated Jun. 14, 2019 (8 Pages in German with translation).
International Preliminary Report on Patentability for International Patent Application No. PCT/EP2019/057997 dated Oct. 13, 2020 (9 Pages in German with translation).
Heck, R. M. et al. Catalytic Air Pollution Control, Commercial Technology, 1995, p. 90.
ISO 11465—Soil Quality—Determination fo dry matter and water content on a mass basis—Gravimetric Method. 1993 (8 pages).

(Continued)

*Primary Examiner* — Timothy C Vanoy
(74) *Attorney, Agent, or Firm* — Smith, Gambrell & Russell, LLP

(57) ABSTRACT

The present invention relates to a catalytically coated wall-flow filter, to a method for the production thereof and to the use thereof in order to reduce harmful exhaust gases of an internal combustion engine.

14 Claims, 2 Drawing Sheets

(56) References Cited

U.S. PATENT DOCUMENTS

Figure 1:
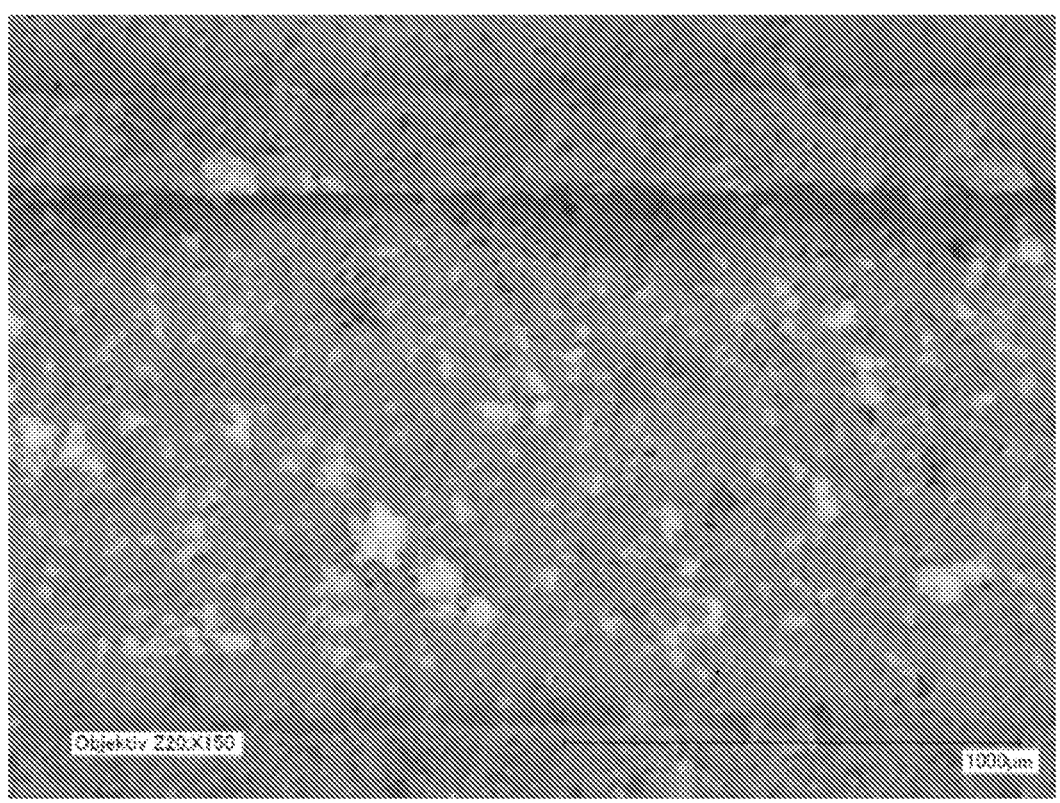

| | | |
|---|---|---|
| 9,517,462 B2 | 12/2016 | Roesch et al. |
| 2001/0003351 A1 | 6/2001 | Chen et al. |
| 2006/0010857 A1 | 1/2006 | Hu et al. |
| 2008/0107806 A1* | 5/2008 | Mergner .............. B01J 37/0215 427/185 |
| 2010/0055012 A1 | 3/2010 | Grisstede et al. |
| 2011/0229634 A1 | 9/2011 | Tsuji et al. |
| 2013/0149440 A1 | 6/2013 | Pyzik et al. |
| 2016/0310935 A1 | 10/2016 | Sutton et al. |
| 2021/0236976 A1 | 8/2021 | Foerster et al. |

FOREIGN PATENT DOCUMENTS

| | | |
|---|---|---|
| DE | 199 21 409 A1 | 11/2000 |
| DE | 10 2010 015 364 A1 | 10/2011 |
| DE | 10 2012 220 181 A1 | 5/2014 |
| DE | 10 2018 110 804 A1 | 11/2019 |
| EP | 0 250 266 A2 | 12/1987 |
| EP | 0 311 758 A1 | 4/1989 |
| EP | 0 324 082 A1 | 7/1989 |
| EP | 1 064 094 B1 | 9/2002 |
| EP | 1 181 970 B1 | 2/2004 |
| EP | 1 136 462 B1 | 8/2004 |
| EP | 1 147 801 B1 | 9/2004 |
| EP | 1 775 022 A1 | 4/2007 |
| EP | 1 911 506 A1 | 4/2008 |
| EP | 2 042 225 A1 | 4/2009 |
| EP | 2 3 88 072 A1 | 11/2011 |
| EP | 2 415 522 A1 | 2/2012 |
| EP | 2 502 661 A1 | 9/2012 |
| EP | 2 610 448 A2 | 7/2013 |
| EP | 2 521 618 B1 | 8/2013 |
| EP | 1 541 220 B1 | 2/2014 |
| EP | 2 727 640 A1 | 5/2014 |
| EP | 2 502 662 B1 | 6/2014 |
| EP | 2 371 451 B1 | 3/2016 |
| EP | 2 371 452 B1 | 3/2016 |
| EP | 1 789 190 B1 | 6/2017 |
| JP | H01-151706 A | 6/1989 |
| JP | 5378659 B2 | 12/2013 |
| JP | 2014-205108 A2 | 10/2014 |
| WO | 99/47260 A1 | 9/1999 |
| WO | 2004/076829 A1 | 9/2004 |
| WO | 2005/016497 A1 | 2/2005 |
| WO | 2005/022667 A2 | 3/2005 |
| WO | 2005/113126 A1 | 12/2005 |
| WO | 2008/000449 A2 | 1/2008 |
| WO | 2008/113445 A1 | 9/2008 |
| WO | 2010/015573 A2 | 2/2010 |
| WO | 2010/097146 A1 | 9/2010 |
| WO | 2011/151711 A1 | 12/2011 |
| WO | 2012/030534 A1 | 3/2012 |
| WO | 2012/175409 A1 | 12/2012 |
| WO | 2013/092707 A1 | 6/2013 |
| WO | 2015/049110 A1 | 4/2015 |
| WO | 2015/143191 A1 | 9/2015 |

OTHER PUBLICATIONS

DIN 66133. Jun. 1993, Bestimmung der Porenvolumenverteilung und der spezifischen Oberfläche von Feststoffen durch Quecksilberintrusionv. [Determination of the pore volume distribution and the specific surface area of solids by mercury intrusion] (3 pages in German with machine translation).

DIN 66134. Feb. 1998, Bestimmung der Porengrößenverteilung und der spezifischen Oberfläche mesoporöser Feststoffe durch Stickstoffsorption Verfahren nach Barrett, Joyner und Halenda (BJH) [Determination of the pore size distribution and the specific surface mesoporous solids by nitrogen sorption Procedure according to Barrett, Joyner and Halenda (BJH)] (7 pages in German with machine translation).

ISO 13320: 2009(E). Particle size analysis—Laser diffraction Methods (60 pages).

Database of Zeolite Structures—CHA Framework Type. Accessed Apr. 10, 2018, http://europe.iza-structure.org/IZA-SC/framework.php?STC=CHA.

Database of Zeolite Structures—AEI Framework Type. Accessed Apr. 10, 2018, http://europe.iza-structure.org/IZA-SC/framework.php?STC=AEI.

Tuenter, G. et al. Kinetics and Mechanism of the $NO_x$ Reduction with $NH_3$ on $V_2O_5$—$WO_3$—$TIO_2$ Catalyst. Ind. Eng. Chem. Prod. Res. Dev. 1986. vol. 25, pp. 633-636.

Kasaoka, S. et al., Effect of Inlet NO/NO2 Molar Ratio and Contribution of Oxygen in the Catalytic Reduction of Nitrogen Oxides with Ammonia. Nippon Kagaku Kaishi 1978, vol. 6, pp. 874-881.

Avila, P., et al., Catalyst for NOx Removal in Nitric-Acid Plant Gaseous Effluents. Atmospheric Environment. 1993, vol. 27A, pp. 443-447.

Mayer, T. Feststoff-SCR-System auf Basis von Ammoniumcarbamat [Solid SCR system based on ammonium carbamate], dissertation, Technical University of Kaiserslautern, 2005 (161 Pages).

Wikipedia. Color difference. Accessed Jun. 4, 2018. https://en.wikipedia.org/wiki/Color_difference (6 Pages).

Stieß, M. Mechanical Process Engineering—Particle Technology 1, Springer, 3rd edition 2009. Kapitel 2. Kennzeichnungen von Partikeln und dispersen Stoffsystemen [Chapter 2 Identification of particles and disperse Substance systems] pp. 9-95 in German with machine Translation.

* cited by examiner

COATED WALL-FLOW FILTER

The present invention relates to a catalytically coated wall-flow filter, to a method for the production thereof and to the use thereof in order to reduce harmful exhaust gases of an internal combustion engine.

The exhaust gas of internal combustion engines in motor vehicles typically contains the harmful gases carbon monoxide (CO) and hydrocarbons (HC), nitrogen oxides ($NO_x$), and possibly sulfur oxides ($SO_x$), as well as particulates that mostly consist of solid carbon-containing particles and possibly adherent organic agglomerates. These are called primary emissions. CO, HC, and particulates are the products of the incomplete combustion of the fuel inside the combustion chamber of the engine. Nitrogen oxides form in the cylinder from nitrogen and oxygen in the intake air when combustion temperatures exceed 1200° C. Sulfur oxides result from the combustion of organic sulfur compounds, small amounts of which are always present in non-synthetic fuels. Compliance in the future with statutory exhaust emission limits for motor vehicles applicable in Europe, China, North America, and India requires the extensive removal of said harmful substances from the exhaust gas. For the removal of these emissions, which are harmful to health and environment, from the exhaust gases of motor vehicles, a variety of catalytic technologies for the purification of exhaust gases have been developed, the fundamental principle of which is usually based upon guiding the exhaust gas that needs purification over a flow-through or wall-flow honeycomb body with a catalytically active coating applied thereto. The catalytic converter facilitates the chemical reaction of different exhaust gas components, while forming non-hazardous products, such as carbon dioxide, water, and nitrogen.

The flow-through or wall-flow honeycomb bodies just described are also called catalyst supports, carriers, or substrate monoliths, as they carry the catalytically active coating on their surface or in the walls forming this surface. The catalytically active coating is often applied to the catalyst support in the form of a suspension in a so-called coating operation. Many such processes have been published in the past by automotive exhaust-gas catalytic converter manufacturers (EP1064094B1, EP2521618B1, WO10015573A2, EP1136462B1, U.S. Pat. No. 6,478,874B1, U.S. Pat. No. 4,609,563A, WO9947260A1, JP5378659B2, EP2415522A1, JP2014205108A2).

The operating mode of the internal combustion engine is decisive for the respectively possible methods of harmful substance conversion in the catalytic converter in each case. Diesel engines are usually operated with excess air, most spark-ignition engines with a stoichiometric mixture of intake air and fuel. Stoichiometrically means that on average exactly as much air is available for combustion of the fuel present in the cylinder as is required for complete combustion. The combustion air ratio λ (A/F ratio; air/fuel ratio) sets the air mass $m_{L,actual}$ which is actually available for combustion in relation to the stoichiometric air mass $m_{L,st}$:

$$\lambda = \frac{m_{i,actual}}{m_{l,st}}$$

If λ<1 (e.g., 0.9), this means "air deficiency" and one speaks of a rich exhaust gas mixture; λ>1 (e.g., 1.1) means "excess air" and the exhaust gas mixture is referred to as lean. The statement λ=1.1 means that 10% more air is present than would be required for the stoichiometric reaction.

When lean-burn motor vehicle engines are mentioned in the present text, reference is thereby made mainly to diesel engines and to predominantly on average lean-burn spark-ignition engines. The latter are gasoline engines predominantly operating on average with a lean A/F ratio (air/fuel ratio). In contrast, most gasoline engines are operated with an on-average stoichiometric combustion mixture. In this respect, the expression "on average" takes into consideration the fact that modern gasoline engines are not statically operated with a fixed air/fuel ratio (A/F ratio; λ value). It is rather the case that a mixture with a discontinuous course of the air ratio λ around λ=1.0 is predetermined by the engine control system, resulting in a periodic change of oxidizing and reducing exhaust gas conditions. This change in the air ratio λ is significant for the exhaust gas purification result. To this end, the λ value of the exhaust gas is regulated with a very short cycle time (approx. 0.5 to 5 Hz) and an amplitude Δλ of 0.005≤Δλ≤0.07 around the value λ=1.0. On average, the exhaust gas under such operating states should therefore be described as "on average" stoichiometric. In order for these deviations to not have a negative effect on the result of exhaust gas purification when the exhaust gas flows over the three-way catalytic converter, the oxygen-storing materials contained in the three-way catalytic converter balance out these deviations by absorbing oxygen from the exhaust gas or releasing it into the exhaust gas as needed (Catalytic Air Pollution Control, Commercial Technology, R. Heck et al., 1995, p. 90). However, due to the dynamic mode of operation of the engine in the vehicle, further deviations from this state also occur at times. For example, under extreme acceleration or while coasting, the operating states of the engine, and thus of the exhaust gas, can be adjusted and can, on average, be hypostoichiometric or hyperstoichiometric. However, lean-burn spark-ignition engines have an exhaust gas which is predominantly, i.e., for the majority of the duration of the combustion operation, combusted with an air/fuel ratio that is lean on average.

The harmful gases carbon monoxide and hydrocarbons from a lean exhaust gas can easily be rendered harmless by oxidation on a suitable oxidation catalyst. In a stoichiometrically operated internal combustion engine, all three harmful gases (HC, CO, and NOx) can be eliminated via a three-way catalytic converter.

The reduction of nitrogen oxides to nitrogen ("denitrification" of the exhaust gas) is more difficult on account of the high oxygen content of a lean-burn engine. A known method is selective catalytic reduction (SCR) of the nitrogen oxides in a suitable catalytic converter or SCR catalytic converter for short. This method is currently preferred for the denitrification of lean-engine exhaust gases. The nitrogen oxides contained in the exhaust gas are reduced in the SCR method with the aid of a reducing agent metered into the exhaust system from an external source. Ammonia is used as the reducing agent, which converts into nitrogen and water the nitrogen oxides present in the exhaust gas at the SCR catalytic converter. The ammonia used as reducing agent may be made available by metering an ammonia precursor compound, for example urea, ammonium carbamate, or ammonium formate, into the exhaust system, and by subsequent hydrolysis.

Diesel particulate filters or gasoline particulate filters with and without an additional catalytically active coating are suitable units for removing the particulate emissions. In order to meet the legal standards, it is desirable for current and future applications for the exhaust gas aftertreatment of internal combustion engines to combine particulate filters with other catalytically active functionalities not only for reasons of cost but also for installation space reasons. The use of a particulate filter, whether catalytically coated or not, leads to a noticeable increase in the exhaust-gas back pressure in comparison with a flow-through support of the same dimensions and thus to a reduction in the torque of the engine or possibly to increased fuel consumption. In order to not increase the exhaust-gas back pressure even further, the amounts of oxidic support materials for the catalytically active noble metals of the catalytic converter or oxidic catalyst materials are generally applied in smaller quantities in the case of a filter than in the case of a flow-through support. As a result, the catalytic effectiveness of a catalytically coated particulate filter is frequently inferior to that of a flow-through monolith of the same dimensions.

There have already been some efforts to provide particulate filters which have good catalytic activity due to an active coating and yet have the lowest possible exhaust-gas back pressure. On the one hand, it has proven to be advantageous if the catalytically active coating is not present as a layer on the wall of a porous wall-flow filter, but instead the wall of the filter is to be interspersed with the catalytically active material (WO2005016497A1, JPH01-151706, EP1789190B1). For this purpose, the particle size of the catalytic coating is selected such that the particles penetrate into the pores of the wall-flow filters and can be fixed there by calcination.

A further functionality of the filter, which can be improved by a coating, is its filtration efficiency, i.e., the filtering effect itself. WO 2011151711A1 describes a method by which a dry aerosol is applied to an uncoated or catalytically coated filter. The aerosol is provided by the distribution of a powdered high-melting metal oxide having a particle size of 0.2 μm to 5 μm and guided through the inlet end of a wall-flow filter by means of a gas stream. In this case, the individual particles agglomerate to form a bridged network of particles and are deposited as a layer on the surface of the individual inlet channels passing through the wall-flow filter. The typical powder loading of a filter is between 5 g and 50 g per liter of filter volume. It is expressly pointed out that it is not desirable to obtain a coating inside the pores of the wall-flow filter with the metal oxide.

A further method for increasing the filtration efficiency of catalytically inactive filters is described in WO2012030534A1. In this case, a filtration layer ("discriminating layer") is created on the walls of the flow channels of the inlet side by the deposition of ceramic particles via a particle aerosol. The layers consist of oxides of zirconium, aluminum or silicon, preferably in fiber form ranging from 1 nm to 5 μm, and have a layer thickness greater than 10 μm, typically 25 μm to 75 μm. After the coating process, the applied powder particles are calcined in a thermal process.

A further method in which a membrane ("trapping layer") is produced on the surfaces of the inlet channels of filters in order to increase the filtration efficiency of catalytically inactive wall-flow filters is described in patent specification U.S. Pat. No. 8,277,880B2. The filtration membrane on the surfaces of the inlet channels is produced by sucking a gas stream loaded with ceramic particles (for example, silicon carbide, cordierite) through. After application of the filter layer, the honeycomb body is fired at temperatures greater than 1000° C. in order to increase the adhesive strength of the powder layer on the channel walls. EP250266A1 and EP2502662B1 mention further on-wall coatings by powder application.

A coating inside the pores of a wall-flow filter unit by spraying dry particles, for example using an aerosol generator, is described in EP2727640A1. Here, a non-catalytically coated wall-flow filter is coated using a gas stream containing, for example, aluminum oxide particles in such a way that the complete particles, which have a particle size of 0.1 μm to 5 μm, are deposited as a porous filling in the pores of the wall-flow filter. The particles themselves can realize a further functionality of the filter in addition to the filtering effect. For example, these particles are deposited in the pores of the filter in an amount greater than 80 g/l based on the filter volume. They fill in 10% to 50% of the volume of the pores in the channel walls. This filter, both loaded with soot and without soot, has an improved filtration efficiency compared to the untreated filter together with a low exhaust-gas back pressure of the soot-loaded filter.

Nevertheless, there continues to be a need for sufficiently catalytically active particulate filters in which the filtration efficiency is optimized with respect to the exhaust-gas back pressure. The object of the present invention is therefore to provide a correspondingly catalytically active particulate filter in which an adequate filtration efficiency is coupled with the lowest possible increase in the exhaust-gas back pressure.

These and other objects which are obvious from the prior art are achieved by the specification of a particulate filter according to claims 1 to 10. Claims 11 to 13 are directed at the production of a particulate filter according to the invention. Claim 14 aims at using the particulate filter for the exhaust-gas aftertreatment of internal combustion engines.

The object posed is extremely successfully achieved by providing a catalytically active wall-flow filter for reducing the harmful substances in the exhaust gas of an internal combustion engine, wherein this dry filter coated with catalytically active material in the wall is selectively impinged on its inlet side with a dry powder/gas aerosol which has a high-melting compound in such a way that the powder is deposited in the pores of the filter walls and does not form a continuous layer on the walls of the filter. It is assumed that the dry atomization of sufficiently small powder particles in the dry state will result in the particles not agglomerating. The impingement of the dry, catalytically coated filter with the dry powder/gas aerosol results in the powder particles being deposited in the pores of the filter following the flow of the gas (FIG. 1). An outstanding filtration efficiency of the catalytically coated filter together with a sufficiently low exhaust-gas back pressure is thereby achieved (FIGS. 2 and 3). The performance of the filter with regard to its catalytic activity is not impaired thereby but surprisingly improves under certain conditions. The filters described herein, which are catalytically coated and then impinged with powder, differ from those that are produced in the exhaust system of a vehicle by ash deposition during operation. According to the invention, the catalytically active filters are deliberately powder-sprayed with a specific, dry powder. As a result, the balance between filtration efficiency and exhaust-gas back pressure can be adjusted selectively right from the start. Wall-flow filters in which undefined ash deposits have resulted from combustion in the cylinder during driving operation are therefore not included in the present invention.

Dry in the sense of the present invention accordingly means exclusion of the application of a liquid, such as water. In particular, the production of a suspension of the powder in a liquid for atomization into a gas stream should be avoided, A certain moisture content may possibly be tolerable both for the filter and for the powder, provided that achieving the objective, the most complete possible deposition of the powder in the pores, is not negatively affected. As a rule, the powder is free-flowing and sprayable. The moisture content of the powder or of the filter at the time of application of the powder should be less than 20%, preferably less than 10%, and very particularly preferably less than 5% (measured at 20° C. and normal pressure, ISO 11465, latest version on the date of application).

All ceramic materials customary in the prior art can be used as wall-flow monoliths or wall-flow filters. Porous wall-flow filter substrates made of cordierite, silicon carbide, or aluminum titanate are preferably used. These wall-flow filter substrates have inlet and outlet channels, wherein the respective downstream ends of the inlet channels and the upstream ends of the outlet channels are offset against each other and closed off with gas-tight "plugs." In this case, the exhaust gas that is to be purified and that flows through the filter substrate is forced to pass through the porous wall between the inlet channel and outlet channel, which delivers an excellent particulate filtering effect. The filtration property for particulates can be designed by means of porosity, pore/radii distribution, and thickness of the wall. The porosity of the uncoated wall-flow filters is typically more than 40%, generally from 40% to 75%, particularly from 50% to 70% [as measured according to DIN 66133, latest version on the date of application]. The average pore size of the uncoated filters is at least 7 μm, for example from 7 μm to 34 μm, preferably more than 10 μm, in particular more preferably from 10 μm to 25 μm, or very preferably from 15 μm to 20 μm [measured according to DIN 66134, latest version on the date of application]. The completed filters with a pore size of typically 10 μm to 20 μm (catalytically coated) and a porosity of 50% to 65% (catalytically coated) are particularly preferred.

The aerosol consisting of the gas and the powder may be prepared in accordance with the requirements of the person skilled in the art. For this purpose, a powder is commonly mixed with a gas. This mixture of gas and powder thus produced is then advantageously injected into a gas stream which carries the finely distributed powder into the inlet end of the wall-flow filter. All gases considered by the person skilled in the art for the present purpose can be used as gases for producing the aerosol and for inputting into the filter. The use of air is most particularly preferred. However, it is also possible to use other reaction gases which can develop either an oxidizing or a reducing activity with respect to the powder used. With certain powders, the use of noble gases may also prove advantageous. Mixtures of the listed gases are also conceivable.

Powders which are preferably used in the present invention for producing the aerosol are sufficiently familiar to the person skilled in the art. These are generally high-melting metal compounds, which are commonly used as support materials for catalysts in the automotive exhaust-gas field. Corresponding metal oxide, metal sulfate, metal phosphate, metal carbonate, or metal hydroxide powders are preferably used. Very particular preference is given to the use of an aerosol which is a mixture of air and a metal oxide powder. Possible metals for the metal compounds are in particular those selected from the group of alkali metals, alkaline earth metals or earth metals, or transition metals. Such metals selected from the group of calcium, magnesium, strontium, barium, aluminum, silicon, titanium, zirconium, cerium are preferably used. As stated, these metals can preferably be used as oxides. Very particular preference is given to the use of cerium oxide, titanium dioxide, zirconium dioxide, silicon dioxide, aluminum oxide, or mixtures or mixed oxides thereof. Here, the term "mixed oxide" (solid solutions of a metal oxide in at least one other) is also understood to mean the use of zeolites and zeotypes. In the context of the invention, zeolites and zeotypes are defined as in WO2015049110A1.

The wall-flow filter, which according to the invention is impinged with the powder/gas aerosol, already carries a catalytic activity within itself. Here, catalytic activity is understood to mean the ability to convert harmful constituents of the exhaust gas from internal combustion engines into less harmful ones. The exhaust gas constituents NOx, CO, and HC should be mentioned here in particular. This catalytic activity is provided according to the person skilled in the art by a coating in the walls of the wall-flow filter with a catalytically active material. The term "coating" is accordingly to be understood to mean the application of catalytically active materials to a wall-flow filter. The coating assumes the actual catalytic function. In the present case, the coating is carried out by applying a correspondingly low-viscosity aqueous suspension of the catalytically active components, also referred to as a washcoat, into the wall of the wall-flow filter, e.g. in accordance with EP1789190B1. After application of the suspension, the wall-flow filter is dried and, if applicable, calcined at an increased temperature. The catalytically coated filter preferably has a loading of 20 g/l to 200 g/l, preferably 30 g/l to 150 g/l. The most suitable amount of loading of a filter coated in the wall depends on its cell density, its wall thickness, and the porosity. In the case of common medium-porous filters (<60% porosity) with, for example, 200 cpsi cell density and 8 mil wall thickness, the preferred loading is 20 g/l to 30 g/l (based on the outer volume of the filter substrate). Highly porous filters (>60% porosity) with, for example, 300 cpsi and 8 mil have a preferred load of 25 g/l to 150 g/l, particularly preferably 50 g/l to 100 g/l.

In principle, all coatings known to the person skilled in the art for the automotive exhaust-gas field are suitable for the present invention. The catalytic coating of the filter may preferably be selected from the group consisting of three-way catalyst, SCR catalyst, nitrogen oxide storage catalyst, oxidation catalyst, soot-ignition coating. With regard to the individual catalytic activities coming into consideration and their explanation, reference is made to the statements in WO2011151711A1.

In order that the powder of the powder/gas aerosol can deposit sufficiently well in the pores of the catalytically coated wall-flow filter, the particle diameter in the aerosol should be at least smaller than the pores of the wall-flow filter. This can be expressed by the ratio of the average particle diameter (measured according to the most recent ISO 13320 on the date of application) d50 in the dry aerosol and the average pore diameter of the wall-flow filter after coating (measured according to DIN 66134, latest version on the date of application) being between 0.03-2, preferably between 0.05-1.43 and very particularly preferably between 0.05-0.63. This ensures that the particles of the powder following the gas stream are able to deposit in the pores of the walls of the wall-flow filter and consequently do not form a continuous layer on the wall (FIG. 1).

Due to the impingement with powder, it is possible to adjust a gradient in the longitudinal direction of the filter from the inlet end to the outlet end. In a preferred embodiment, there is more powder in the vicinity of the outlet plugs of the inlet channel and significantly less powder at the inlet of the filter (toward the engine side). With regard to the amount of loading, the gradient resulting from the coating is advantageous for a further increased filtration efficiency. In this case, the powder in particular fills in the large pores of the filter substrate. Here, it is important that in this process, no "powder membrane," i.e., no powder layer, forms on the filter wall (FIG. 1).

Figure 4:
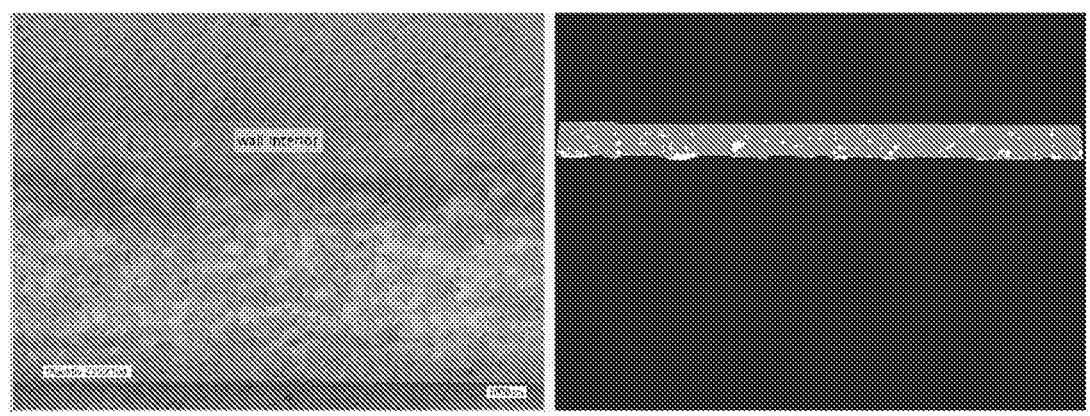

Furthermore, a preferred development of the powder coating is characterized in that 5% to 50%, particularly preferably 5% to 25%, very particularly preferably 8% to 15%, of the total pore volume of the porous filter wall between inlet and outlet channels is filled with powder. The degree of coating of the pore volume of the porous filter walls was determined by means of image analysis of light microscopy images ("wall interior" area in FIG. 4). In this type of analysis, the average color of the wall surface of the non-powder-coated outlet channel is used as a reference for determining the areas coated with powder in the inlet channel, the color difference being defined according to CIE76 of the International Commission on Illumination with a lowest still distinguishable color difference of 2.33.

It is readily apparent to the person skilled in the art that a certain amount of powder must not be exceeded if the particles of the powder are to be deposited exclusively in the pores of the walls of the wall-flow filter. Otherwise the pores would fill up according to the invention and all further material would then only be able to deposit on the channel walls of the wall flow filter. Depending on the porosity and pore size of the wall-flow filter, the upper limit of the loading of the wall-flow filter with the powder therefore is a value at which the pores at the inlet end are completely filled with the powder over the cross-section and no further powder is deposited on the channel walls. As a rule, the loading of the filter with the powder is no more than 50 g/l based on the filter volume. The value is preferably not more than 20 g/l, very particularly preferably not more than 10 g/l. A lower limit naturally provides the desired increase in filtration efficiency.

According to the invention, the powder can be used as such as described above. However, the use of dry powder which supports a catalytic activity with regard to exhaust-gas aftertreatment is also conceivable. Accordingly, the powder itself can likewise be catalytically active with regard to reducing harmful substances in the exhaust gas of an internal combustion engine. Suitable for this purpose are all activities known to the person skilled in the art, such as TWC, DOC, SCR, LNT or soot-burn-off-accelerating catalysts. The powder will generally have the same catalytic activity as the catalytic coating of the filter. This further increases the overall catalytic activity of the filter as compared to filters not coated with powder. In this respect, it may be possible to use aluminum oxide, for example, impregnated with a noble metal for producing the powder/gas aerosol. It is likewise conceivable for catalytically active material to be used for the SCR reaction. Here, the powder may consist, for example, of zeolites or zeotypes exchanged with transition metal ions. Very particular preference is given in this context to the use of zeolites exchanged with iron and/or copper. As material used for producing the powder/gas aerosol, extreme preference is given to CuCHA (copper-exchanged chabazite; http://europeiza-structure-.org/IZA-SC/framework.php?STC=CHA) or CuAEI (http://europe.iza-structure.org/IZA-SC/framework.php?STC=AEI).

The wall-flow filter produced according to the invention and catalytically coated exhibits an excellent filtration efficiency with only a moderate increase in exhaust-gas back pressure as compared to a wall-flow filter in the fresh state that has not been impinged by powder. The wall-flow filter according to the invention preferably exhibits an increase in filtration efficiency of at least 7% absolute, preferably at least 20% absolute, and very particularly preferably at least 40% absolute at a relative increase in the exhaust-gas back pressure of the fresh wall-flow filter of at most 40%, preferably at most 20%, and very particularly preferably at most 10%, as compared to a fresh filter coated with catalytically active material but not treated with powder. As stated, the powder deposits exclusively only into the open pores of the filter and forms a porous matrix. The slight increase in back pressure is attributable to the fact that the cross-section of the channels at the inlet end is not reduced by the application, according to the invention, of a powder to the filter. It is assumed that the powder forms a porous structure in itself, which is believed to have a positive effect on the back pressure. For this reason, a filter according to the invention should also exhibit better exhaust-gas back pressure than those of the prior art in which a powder was deposited on the walls of the inlet end of a filter.

The present invention also provides a method for producing a catalytically active wall-flow filter according to the invention. In principle, the person skilled in the art knows how to produce an aerosol from a powder and a gas in order to then conduct the aerosol by means of a gas stream through the filter which is to be impinged by the powder. According to the invention, a carrier gas is charged with a powder and sucked into a filter. This ensures that the powder can be distributed sufficiently well in the gas stream for it to be able to penetrate into the inlet channels of the filter at the inlet end of the wall-flow filter.

In this case, the powder is deposited exclusively in the accessible pores of the filter walls without forming a partial or continuous layer on the filter wall in the inlet channels. A concentration gradient of the powder over the axial length of the carrier can advantageously be adjusted, for example, by using different flow breakers in the aerosol gas stream upstream of the inlet end of the carrier and by adjusting the coating parameters, such as the flow velocity of the carrier air and atomizer air. Even the physical parameters of the powder used, such as the bulk density, residual moisture content, and particle size distribution, can be used in a targeted manner to create the desired gradient described above. Addition may be continuous until the sufficient amount of powder is deposited in the filter. A pulsed addition is also possible such that the powder charged with compressed gas is metered periodically into the gas stream sucked through the filter until the sufficient amount of powder has been deposited in the filter. The powder can be injected not only continuously or in a pulsating manner into a gas stream flowing permanently through the filter but can also be sprayed beforehand into a separate buffer chamber. After the powder has been sprayed, a flap opens to a chamber in which the substrate is clamped. The gas/powder mixture can then be introduced from the buffer chamber into the substrate by a suction pulse. Depending on the amount of powder to be introduced into the substrate, this process can be repeated as often as desired. Apparatuses and methods in which such a metering of a powder is described are appreciated in the prior art (DE4225970C1, U.S. Pat. Nos. 8,495,968B2, 8,632,852B2, 8,534,221B2, 8,277,880B2; see also above).

In order to be able to draw the powder sufficiently deep into the pores on the surface of the filter wall at the inlet end of the filter, a certain suction power (if the powder is sucked through the filter) or a pressure power (if the powder is pressed through the filter) or optionally both are needed. In orientation experiments for the respective filter and the respective powder, the person skilled in the art can form an idea for himself in this respect. It has been found that the aerosol (powder/gas mixture) is preferably sucked and/or pressed through the filter at a rate of 5 m/s to 50 m/s, more preferably 10 m/s to 40 m/s, and very particularly preferably 15 m/s to 35 m/s. This likewise achieves an advantageous adhesion of the applied powder. In the case of poorly adherent powders, aftertreatment with a bonding agent may help.

As already described, the powder is first converted into an aerosol and then sprayed into a gas stream. This can be done according to the requirements of the person skilled in the art (EP2371451B1; EP2371452B1; EP2388072A1). The gas stream then carries the finely distributed powder into the inlet end of the wall-flow filter. In this case, the powder is then deposited exclusively in the pores of the channel walls. This is essentially achieved by the powder being dry in the sense of the invention during the impingement of the wall-flow filter. This is optionally mixed with the ambient air and applied to the filter. Without being bound by any particular theory, it is assumed that this manner of application of the powder counteracts caking or agglomeration of the individual powder constituents. This preserves the original particle size of the powder particles in the aerosol. In this way, it is then possible to deposit the powder particles in the wall pores of the wall-flow filter and not as described in the prior art onto the pores and onto the walls of the inlet channels.

The present invention also relates to the use of a wall-flow filter according to the invention for reducing the harmful exhaust gases of an internal combustion engine. In principle, all catalytic exhaust-gas aftertreatments (see above) with a filter considered by the person skilled in the art for this purpose but in particular those with SCR-catalytically coated filters (SDPF) or three-way catalytically coated filters (catalyzed gasoline particulate filters, cGPF) can serve for application purposes. The catalysts produced using the method according to the invention are suitable for all these applications. The use of the filters according to the invention for the treatment of exhaust gases of a stoichiometrically operated internal combustion engine is preferred.

Wall-flow filters which are to be used according to the invention and have a catalytic coating and which eliminate nitrogen oxides and hydrocarbons and carbon monoxide (HC, CO, and NOx) in the stoichiometric exhaust gas ($\lambda=1$ conditions) are usually referred to as catalyzed gasoline particulate filters (cGPF). In addition, they can convert the oxides of the nitrogen under rich exhaust gas conditions and CO and HC under lean conditions. They for the most part include platinum group metals, such as Pt, Pd, and Rh, as catalytically active components, wherein Pd and Rh are particularly preferred. The catalytically active metals are often deposited with high dispersion on large-surface oxides of aluminum, zirconium, and titanium, or mixtures thereof, which may be stabilized by additional transition elements, such as lanthanum, yttrium, praseodymium, etc. Three-way catalysts also include oxygen-storing materials (for example, Ce/Zr mixed oxides; see below). For example, a suitable three-way catalytic coating is described in EP1181970B1, EP1541220B1, WO2008113445A1, WO2008000449A2, which are referenced here.

Oxygen-storing materials have redox properties and can react with oxidizing components, such as oxygen or nitrogen oxides in an oxidizing atmosphere, or with reducing components, such as hydrogen or carbon monoxide, in a reducing atmosphere. The embodiment of the exhaust gas aftertreatment of an internal combustion engine operating essentially in the stoichiometric range is described in EP1911506A1. In this case, a particulate filter provided with an oxygen-storing material is used. Advantageously, such an oxygen-storing material consists of a cerium/zirconium mixed oxide. Further oxides, in particular oxides of rare earth metals, may be present. Preferred embodiments of the particulate filter according to the invention thus additionally include lanthanum oxide, yttrium oxide, or neodymium oxide. In this regard, reference is also made to the disclosure of U.S. Pat. Nos. 6,605,264BB and 6,468,941BA. Other such storage materials and three-way catalysts are described in WO05113126A1, U.S. Pat. Nos. 6,387,338BA, 7,041,622BB, EP2042225A1, for example.

The oxygen-storing materials described in the publications are able to change their oxidation state as a function of the ambient atmosphere. Examples of oxygen-storing materials are cerium oxide and praseodymium oxide or mixed oxides containing these oxides, which may additionally contain oxides of metals selected from the group of zirconium, neodymium, yttrium, and lanthanum. These oxygen-storing materials are often activated with noble metals, such as Pd, Rh, and/or Pt, whereby the storage capacity and storage characteristics can be modified. These substances are able to remove oxygen from the exhaust gas in lean operation and to release it again under rich exhaust gas conditions. This prevents NOx conversion over the TWC from decreasing and NOx breakthroughs from occurring during a short-term deviation of the fuel-air ratio from $\lambda=1$ into the lean range. Furthermore, a filled oxygen storage prevents HC and CO breakthroughs when the exhaust gas temporarily passes into the rich range, since, under rich exhaust gas conditions, the stored oxygen reacts first with the excess HC and CO before a breakthrough occurs. In this case, the oxygen storage is used as a buffer against fluctuations around $\lambda=1$. A partially filled oxygen storage provides the best condition for being able to absorb short-term deviations from $\lambda=1$. Oxygen sensors (lambda sensors) are used in order to be able to determine the fill level of the oxygen storage during operation.

The oxygen-storing capacity correlates with the aging state of the entire three-way catalyst. As part of OBD (on-board diagnosis), the determination of the storage capacity serves to detect the current activity, and thus the aging state, of the catalyst.

Various catalytic functions may also be combined with one another. The three-way catalysts mentioned above may, for example, be equipped with a nitrogen oxide storage functionality (TWNSC). As stated above, these catalysts consist of materials that, under stoichiometric exhaust gas conditions, impart to the catalyst the function of a three-way catalyst, and that have a function for the storage of nitrogen oxides under lean exhaust-gas conditions. These stored nitrogen oxides are regenerated during brief rich operating phases in order to restore storage capability. The manufacturing of a corresponding TWNSC preferably takes place via the assembly of materials that are used for the construction of a three-way catalyst and a nitrogen oxide storage catalyst. The two functions of the TWNSC that are described here may thereby be present on a carrier, blended with or separate from one another in different layers or zones. A particularly preferred embodiment of such a catalyst is described in WO2010097146A1 or WO2015143191A1, for example. However, during the regeneration, an air/fuel mixture is preferably maintained which corresponds to a $\lambda$ of 0.8 to 1.

This value lies particularly preferably between 0.85 and 0.99, and very particularly preferably between 0.95 and 0.99.

A further application is the removal of nitrogen oxides from lean exhaust gas mixtures by means of the SCR process. For this SCR treatment of the preferably lean exhaust gas, ammonia or an ammonia precursor compound is injected into the exhaust gas and both are conducted over a wall-flow filter SCR-catalytically coated according to the invention. The temperature above the SCR filter should be between 150° C. and 500° C., preferably between 200° C. and 400° C. or between 180° C. and 380° C., so that reduction can take place as completely as possible. A temperature range of 225° C. to 350° C. for the reduction is particularly preferred. Furthermore, optimum nitrogen oxide conversions are only achieved when there is a molar ratio of nitrogen monoxide to nitrogen dioxide ($NO/NO_2=1$) or the $NO_2/NOx$ ratio=0.5 (G. Tuenter et al., Ind. Eng. Chem. Prod. Res. Dev. 1986, 25, 633-636; EP1147801B1; DE2832002A1; Kasaoka et al., Nippon Kagaku Kaishi (1978), 6, 874-881; Avila et al., Atmospheric Environment (1993), 27A, 443-447). Optimum conversions starting at 75% conversion are already achieved at 250° C. with simultaneous optimum selectivity with respect to nitrogen in accordance with the stoichiometry of the reaction equation

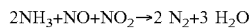

only with a $NO_2/NOx$ ratio of around 0.5. This applies not only to SCR catalytic converters based on metal-exchanged zeolites but to all common, i.e., commercially available, SCR catalytic converters (so-called fast SCRs). A corresponding $NO:NO_2$ content may be achieved with oxidation catalysts positioned upstream of the SCR catalyst.

The injection devices used can be selected arbitrarily by the person skilled in the art. Suitable systems can be found in the literature (T. Mayer, Feststoff-SCR-System auf Basis von Ammoniumcarbamat [Solid SCR system based on ammonium carbamate], dissertation, Technical University of Kaiserslautern, 2005). The ammonia can be introduced into the exhaust gas stream via the injection device as such or in the form of a compound which produces ammonia under ambient conditions. Examples of possible compounds include, among other things, aqueous solutions of urea or ammonium formate, as well as solid ammonium carbamate. These can be taken from a provided source known per se to the person skilled in the art and can be added to the exhaust gas stream in a suitable manner. The person skilled in the art particularly preferably uses injection nozzles (EP0311758A1). By means of these, the optimum ratio of $NH_3/NOx$ is adjusted so that the nitrogen oxides can be converted into $N_2$ as completely as possible.

Wall-flow filters having an SCR-catalytic function are referred to as SDPF. These catalysts frequently possess a function for storing ammonia and a function whereby nitrogen oxides can react with ammonia to form harmless nitrogen. An $NH_3$-storing SCR catalyst can be designed in accordance with types known to the person skilled in the art. In the present case, this is a wall-flow filter which is coated with a material catalytically active for the SCR reaction and in which the catalytically active material, commonly called the "washcoat," is present in the pores of the wall-flow filter. However, along with the—in the proper sense of the term—'catalytically active' component, this wall-flow filter may also contain other materials, such as binders consisting of transition metal oxides, and large-surface carrier oxides, such as titanium oxide, aluminum oxide, in particular gamma-$Al_2O_3$, zirconium oxide, or cerium oxide. Also suitable as SCR catalysts are those that are made up of one of the materials listed below. However, it is also possible to use zoned or multilayer arrangements or even arrangements consisting of a plurality of components one behind the other (preferably two or three components) with the same materials as the SCR component or different materials. Mixtures of different materials on a substrate are also conceivable.

The actual catalytically active material used in this regard according to the invention is preferably selected from the group of transition-metal-exchanged zeolites or zeolite-like materials (zeotypes). Such compounds are sufficiently familiar to the person skilled in the art. Preferred in this regard are materials from the group consisting of levynite, AEI, KFI, chabazite, SAPO-34, ALPO-34, zeolite β, and ZSM-5. Zeolites or zeolite-like materials of the chabazite type, in particular CHA or SAPO-34, as well as LEV or AEI are particularly preferred. In order to ensure sufficient activity, these materials are preferably provided with transition metals from the group consisting of iron, copper, manganese, and silver. It should be mentioned in this respect that copper is especially advantageous. The ratio of metal to framework aluminum or, in the case of SAPO-34, the ratio of metal to framework silicon is normally between 0.3 and 0.6, preferably 0.4 to 0.5. The person skilled in the art knows how to equip the zeolites or the zeolite-like materials with the transition metals (EP0324082A1, WO1309270711A1, WO2012175409A1, and the literature cited therein) in order to be able to deliver good activity with respect to the reduction of nitrogen oxides with ammonia. Furthermore, vanadium compounds, cerium oxides, cerium/zirconium mixed oxides, titanium oxide, and tungsten-containing compounds, and mixtures thereof can also be used as catalytically active material.

Materials, which in addition have proven themselves to be advantageous for the application of storing $NH_3$, are known to the person skilled in the art (US20060010857A1, WO2004076829A1). In particular, microporous solid materials, such as so-called molecular sieves, are used as storage materials. Such compounds, selected from the group consisting of zeolites, such as mordenites (MOR), Y-zeolites (FAU), ZSM-5 (MFI), ferrierites (FER), chabazites (CHA), and other "small pore zeolites," such as LEV, AEI, or KFI, and β-zeolites (BEA), as well as zeolite-like materials, such as aluminum phosphate (AlPO) and silicon aluminum phosphate SAPO or mixtures thereof, can be used (EP0324082A1). Particularly preferably used are ZSM-5 (MFI), chabazites (CHA), ferrierites (FER), ALPO- or SAPO-34, and β-zeolites (BEA). Especially preferably used are CHA, BEA, and AlPO-34 or SAPO-34. Extremely preferably used are materials of the LEV or CHA type, and here maximally preferably CHA or LEV or AEI. Insofar as a zeolite or a zeolite-like compound as just mentioned above is used as catalytically active material in the SCR catalyst, the addition of further $NH_3$-storing materials can, advantageously, naturally be dispensed with. Overall, the storage capacity of the ammonia-storing components used can, in a fresh state at a measuring temperature of 200° C., be more than 0.9 g $NH_3$ per liter of catalyst volume, preferably between 0.9 and 2.5 g $NH_3$ per liter of catalyst volume, and particularly preferably between 1.2 and 2.0 g $NH_3$/liter of catalyst volume, and very particularly preferably between 1.5 and 1.8 g $NH_3$/liter of catalyst volume. The ammonia-storing capacity can be determined using synthesis gas equipment. To this end, the catalyst is first conditioned at 600° C. with NO-containing synthesis gas to fully remove ammonia residues in the drilling core. After the gas has been cooled to 200° C., ammonia is then metered into the synthesis gas at a space velocity of, for example, 30,000 h$^{-1}$ until the ammonia storage in the drilling core is completely filled, and the ammonia concentration measured downstream of the drilling core corresponds to the starting concentration. The ammonia-storing capacity results from the difference between the amount of ammonia metered overall and the amount of ammonia measured on the downstream side in relation to the catalyst volume. The synthesis gas is here typically composed of 450 ppm $NH_3$, 5% oxygen, 5% water, and nitrogen.

In the context of the invention, the feature of the absence of a continuous layer on the walls of the filter is to be understood to mean that the pores of the filter walls are filled with the atomized powder only to the extent that no higher than the upper edge of the pore is reached (FIG. 1) and the powder begins to deposit on the walls. The amount of powder that can thus be deposited depends on the type of powder and the volume of the available pores and can be determined by the person skilled in the art in preliminary experiments under the given boundary conditions.

By means of the filter according to the invention, it is possible to obtain a high filtration efficiency, in particular for small-particulate soots, such as those emitted from spark-ignition engines. In this case, the exhaust-gas back pressure does not increase unduly. The filters show excellent catalytic activity. The exhaust-gas back pressure and the filtration efficiency can be specifically adapted to customer requirements. A correspondingly produced wallflow filter was not yet known from the prior art.

FIGURES

FIG. 1: Image of a wall-flow filter powder-sprayed according to the invention (color photography)

Figure 2:
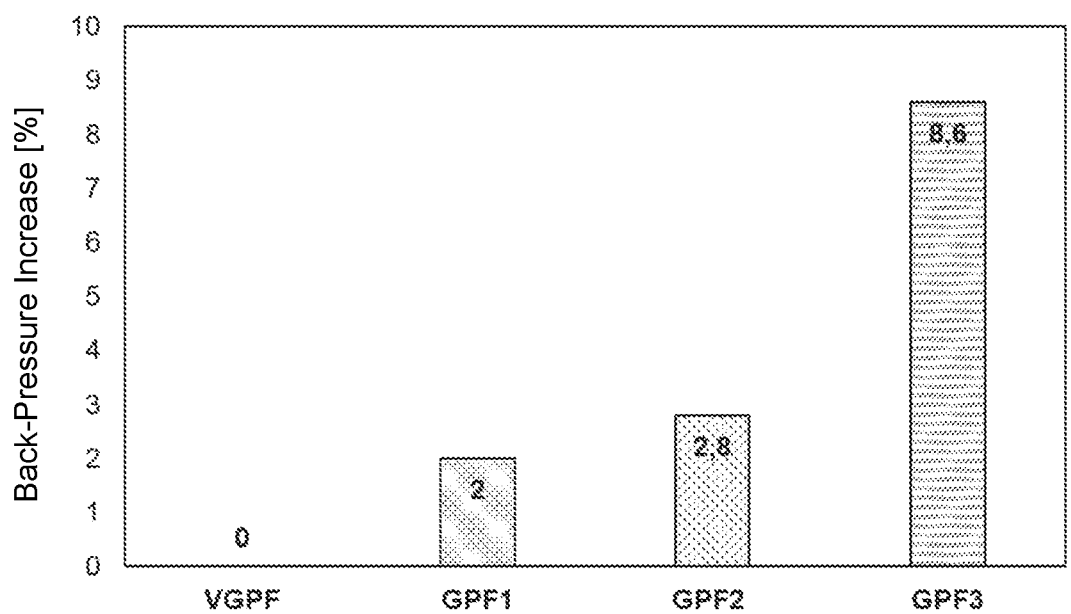

FIG. 2: Increase in exhaust-gas back pressure as a result of the powder-spraying FIG. 3: Increase in filtration efficiency as a result of the powder-spraying according to the invention FIG. 4: Section through a powder-sprayed wall of a wall-flow filter and graphical analysis of points of powder-spraying (color photography)

EXAMPLES

Cordierite wall-flow filters with a diameter of 11.8 cm and a length of 13.5 cm were in-wall coated in order to produce the VGPF, GPF1, GPF2, and GPF3 particulate filters described in the examples and comparative examples. The wall-flow filters had a cell density of 46.5 cells per square centimeter at a wall thickness of 0.203 mm. The average pore size of the filters was 20 μm, with the porosity of the filters being about 65%.

First, a coating suspension containing noble metal was applied to these wall-flow filters. After application of the coating suspension, the filters were dried and then calcined at 500° C. The amount of coating after calcination corresponded to 50 g/l based on the volume of the substrate. This corresponds to the preparation of the VGPF.

Example 1

GPF1: The open pores of an in-wall-coated filter were coated according to the invention with 3.3 g/l, based on the total filter volume, of a dry aluminum oxide. An aluminum oxide having an average particle diameter ($d_{50}$) of 3.5 μm was used as the powder. This corresponds to a ratio of the average particle size of the powder used to the average pore size of the filter of 0.175.

Example 2

GPF2: The open pores of an in-wall-coated filter were coated according to the invention with 5.6 g/l, based on the total filter volume, of a dry aluminum oxide. An aluminum oxide having an average particle diameter ($d_{50}$) of 3.5 μm was used as the powder. This corresponds to a ratio of the average particle size of the powder used to the average pore size of the filter of 0.175.

Example 3

GPF3: The open pores of an in-wall-coated filter were coated according to the invention with 8.6 g/l, based on the total filter volume, of a dry aluminum oxide. An aluminum oxide having an average particle diameter ($d_{50}$) of 3 μm was used as the powder. This corresponds to a ratio of the average particle size of the powder used to the average pore size of the filter of 0.15.

The particulate filters GPF1, GPF2, and GPF3 according to the invention were investigated in comparison with the VGPF produced. After powder coating, the particulate filters were measured for their back pressure; as described below, filtration measurement was then carried out on the dynamic engine test bench. The back-pressure increase of the filters according to the invention is shown in FIG. 2.

Figure 3:
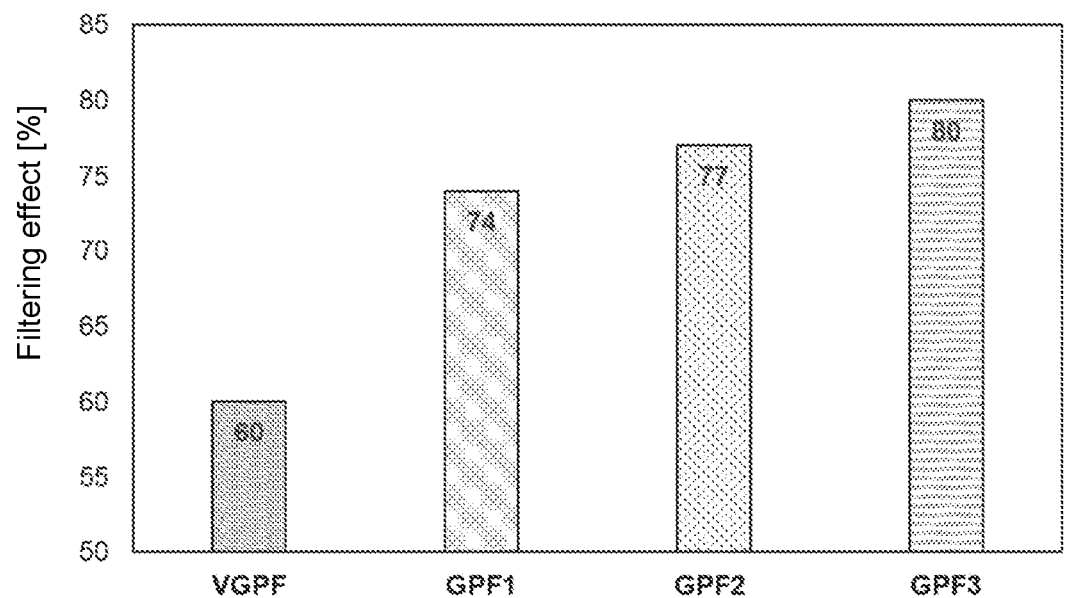

The VGPF, GPF1, GPF2, and GPF3 filters described were investigated for their fresh filtration efficiency on the engine test bench in the real exhaust gas of an engine operating with an on average stoichiometric air/fuel mixture. A globally standardized test procedure for determining exhaust emissions, or WLTP (Worldwide harmonized Light vehicles Test Procedure) for short, was used here. The driving cycle used was WLTC Class 3. The respective filter was installed close to the engine immediately downstream of a conventional three-way catalytic converter. This three-way catalytic converter was the same one for all filters measured. Each filter was subjected to a WLTP. In order to be able to detect particulate emissions during testing, the particle counters were installed upstream of the three-way catalytic converter and downstream of the particulate filter. FIG. 3 shows the results of the filtration efficiency measurement in the WLTP.

FIG. 3 shows the results of the filtration efficiency measurement. Depending on the amount of powder applied and the particle size distribution of the powder used, an improvement in the filtration efficiency by up to 20% at a maximum back-pressure increase (FIG. 2) of only about 9% can be achieved.

The measured data demonstrate that the selective coating of the open pores of an already in-wall-coated filter leads to a significant improvement in filtration efficiency with only slightly increased back pressure.

Catalytic Characterization

The particulate filters VGPF2 as well as GPF4, GPF5 were used for catalytic characterization. The wall-flow filters had a cell density of 46.5 cells per square centimeter at a wall thickness of 0.203 mm. The average pore size of the filters was 18 μm, with the porosity of the filters being about 65%.

First, a coating suspension containing noble metal was applied to these wall-flow filters. After application of the coating suspension, the filters were dried and then calcined at 500° C. The amount of coating after calcination corresponded to 75 g/l, the concentration of Pd being 1.06 g/l and concentration for Rh being 0.21 g/l. All concentrations are based on the volume of the substrate.

Example 4

GPF4: The open pores of an in-wall-coated filter were coated with 10 g/l, based on the total filter volume, of a dry aluminum oxide. An aluminum oxide having an average particle diameter ($d_{50}$) of 3.5 μm was used as the powder. This corresponds to a ratio of the average particle size of the powder used to the average pore size of the filter of 0.194.

Example 5

GPF5: The open pores of an in-wall-coated filter were coated with 15.8 g/l, based on the total filter volume, of a dry aluminum oxide. An aluminum oxide having an average particle diameter ($d_{50}$) of 3.5 μm was used as the powder. This corresponds to a ratio of the average particle size of the powder used to the average pore size of the filter of 0.194.

The catalytically active particulate filters VGPF2, GPF4, and GPF5 were first tested in the fresh state and were then aged together in an engine test bench aging process. The latter consists of an overrun cut-off aging process (Aging 1) with an exhaust gas temperature of 900° C. upstream of the catalyst inlet (maximum bed temperature of 970° C.). The aging time was 19 hours. After the first aging process, the filters were examined for their catalytic activity and then subjected to a further engine test bench aging process (Aging 2). This time, the latter consists of an overrun cut-off aging process with an exhaust gas temperature of 950° C. upstream of the catalyst inlet (maximum bed temperature of 1030° C.). The filters were then tested repeatedly.

In the analysis of catalytic activity, the light-off behavior of the particulate filters was determined at a constant average air ratio λ on an engine test bench, and the dynamic conversion was checked when λ changed. In addition, the filters were subjected to a "lambda sweep test."

The following tables contain the temperatures $T_{50}$ at which 50% of the component under consideration are respectively converted. In this case, the light-off behavior with stoichiometric exhaust gas composition (λ=0.999 with ±3.4% amplitude) was determined. The standard deviation in this test is ±2° C.

Table 1 contains the "light-off" data for the fresh filters, Table 2 the data after Aging 1, and Table 3 the data after Aging 2.

TABLE 1

| | $T_{50}$ HC stoichiometric | $T_{50}$ CO stoichiometric | $T_{50}$ NOx stoichiometric |
|---|---|---|---|
| VGPF2 | 279 | 277 | 278 |
| GPF4 | 279 | 275 | 277 |
| GPF5 | 278 | 274 | 277 |

TABLE 2

| | $T_{50}$ HC stoichiometric | $T_{50}$ CO stoichiometric | $T_{50}$ NOx stoichiometric |
|---|---|---|---|
| VGPF2 | 347 | 351 | 355 |
| GPF4 | 350 | 353 | 356 |
| GPF5 | 349 | 352 | 355 |

TABLE 3

| | $T_{50}$ HC stoichiometric | $T_{50}$ CO stoichiometric | $T_{50}$ NOx stoichiometric |
|---|---|---|---|
| VGPF2 | 396 | 421 | 422 |
| GPF4 | 398 | 413 | 419 |
| GPF5 | 394 | 406 | 412 |

The dynamic conversion behavior of the particulate filters was determined in a range for λ of 0.99 to 1.01 at a constant temperature of 510° C. The amplitude of λ in this case was ±3.4%. Table 3 shows the conversion at the intersection of the CO and NOx conversion curves, along with the associated HC conversion of the aged particulate filters. The standard deviation in this test is ±2%.

Table 4 contains the data for the fresh filters, Table 5 the data after Aging 1, and Table 6 the data after Aging 2.

TABLE 4

| | CO/NOx conversion at the intersection | HC conversion at the λ of the CO/NOx intersection |
|---|---|---|
| VGPF2 | 99% | 99% |
| GPF4 | 99% | 99% |
| GPF5 | 99% | 99% |

TABLE 5

| | CO/NOx conversion at the intersection | HC conversion at the λ of the CO/NOx intersection |
|---|---|---|
| VGPF2 | 98% | 97% |
| GPF4 | 98% | 97% |
| GPF5 | 98% | 97% |

TABLE 6

| | CO/NOx conversion at the intersection | HC conversion at the λ of the CO/NOx intersection |
|---|---|---|
| VGPF2 | 79% | 94% |
| GPF4 | 80% | 94% |
| GPF5 | 83% | 95% |

In comparison to VGPF2, particulate filters GPF4 and GPF5 according to the invention show no disadvantage in catalytic activity in either the fresh or the moderately aged states. In a highly aged state, the powder-coated filters GPF4 and GPF5 even have an advantage in both CO conversion and NOx conversion and also in the dynamic CO/NOx conversion.

The invention claimed is:

1. Catalytically active wall-flow filter for reducing the harmful substances in the exhaust gas of an internal combustion engine, wherein the wall-flow filter comprises walls with pores, and the wall-flow filter is coated with catalytically active material in the walls, with the wall-flow filter being selectively impinged on an inlet side with a dry powder/gas aerosol which has a high-melting compound in such a way that the powder is deposited in the pores of the filter walls and does not form a continuous layer on the walls of the filter.

2. Catalytically active wall-flow filter according to claim 1, characterized in that the aerosol is a mixture of air and a high-melting metal oxide, metal sulfate, metal phosphate, metal carbonate, or metal hydroxide powder.

3. Catalytically active wall-flow filter according to claim 1, characterized in that the catalytically active coating of the filter is selected from the group consisting of three-way catalyst, SCR catalyst, nitrogen oxide storage catalyst, oxidation catalyst, soot-ignition coating, hydrocarbon storage.

4. Catalytically active wall-flow filter according to claim 3, characterized in that the catalytically active coating of the filter consists of at least one metal-ion-exchanged zeolite, cerium/zirconium mixed oxide, aluminum oxide and palladium, rhodium, or platinum, or combinations of these noble metals.

5. Catalytically active wall-flow filter according to claim 1, characterized in that said filter has a loading with the catalytic coating of 20 g/l to 200 g/l based on the volume of the filter.

6. Catalytically active wall-flow filter according to claim 1, characterized in that the ratio of average particle diameter (measured according to the most recent ISO 13320 on the date of application) d50 in the dry aerosol and the average pore diameter of the filter after coating with washcoat (measured according to DIN 66134, latest version on the date of application) is between 0.03 and 2.

7. Catalytically active wall-flow filter according to claim 1, characterized in that the loading of the filter with the powder is not more than 50 g/l based on the volume of the filter.

8. Catalytically active wall-flow filter according to claim 1, characterized in that the powder coating has an increasing gradient from the inlet end to the outlet end.

9. Catalytically active wall-flow filter according to claim 1, characterized in that the powder is also catalytically active with regard to reducing the harmful substances in the exhaust gas of an internal combustion engine.

10. Catalytically active wall-flow filter according to claim 1, characterized in that said filter has an increase in filtration efficiency of at least 5% at a relative increase in the exhaust-gas back pressure of at most 10% compared to a fresh filter coated with catalytically active material but not treated with powder.

11. Method for producing a catalytically active wall-flow filter according to claim 1, characterized in that a carrier gas is charged with a powder and sucked into a filter.

12. Method for producing a catalytically active wall-flow filter according to claim 11, characterized in that the aerosol is sucked through the filter at a rate of 5 m/s to 50 m/s.

13. Method for producing a catalytically active wall-flow filter according to claim 11, characterized in that the powder has a moisture content of less than 20% at the time of impingement on the wall-flow filter.

14. A method of reducing harmful exhaust gases of an internal combustion engine, comprising passing the exhaust gas through a catalytically active wall-flow filter according to claim 1 in order to reduce harmful exhaust gases produced by the internal combustion engine.

* * * * *